United States Patent
Balakrishna et al.

(10) Patent No.: US 9,784,493 B2
(45) Date of Patent: Oct. 10, 2017

(54) CONDENSER EXHAUST FAN LOCATION WITHIN A TRANSPORT REFRIGERATION UNIT

(71) Applicant: THERMO KING CORPORATION, Minneapolis, MN (US)

(72) Inventors: Abhijith Balakrishna, Bangalore (IN); Patil Raju, Bangalore (IN); Wilson Samuel Jesudason Lawrence, Bangalore (IN)

(73) Assignee: THERMO KING CORPORATION, Minneapolis, MN (US)

( * ) Notice: Subject to any disclaimer, the term of this patent is extended or adjusted under 35 U.S.C. 154(b) by 99 days.

(21) Appl. No.: 14/430,718

(22) PCT Filed: Sep. 24, 2013

(86) PCT No.: PCT/US2013/061346
§ 371 (c)(1),
(2) Date: Mar. 24, 2015

(87) PCT Pub. No.: WO2014/047615
PCT Pub. Date: Mar. 27, 2014

(65) Prior Publication Data
US 2015/0292788 A1    Oct. 15, 2015

Related U.S. Application Data

(60) Provisional application No. 61/704,786, filed on Sep. 24, 2012.

(51) Int. Cl.
*F25D 17/06*   (2006.01)
*F25D 17/04*   (2006.01)
(Continued)

(52) U.S. Cl.
CPC ......... *F25D 17/042* (2013.01); *B60H 1/3226* (2013.01); *B60H 1/3232* (2013.01);
(Continued)

(58) Field of Classification Search
CPC .... F25D 17/042; F25D 23/003; F25D 19/003; B60H 1/3232; B60H 1/3226; B60P 3/20
See application file for complete search history.

(56) References Cited

U.S. PATENT DOCUMENTS

| | | | |
|---|---|---|---|
| 3,871,188 A | | 3/1975 | Vold et al. |
| 4,257,240 A | * | 3/1981 | Christiansen ........ B60H 1/3226 62/237 |

(Continued)

FOREIGN PATENT DOCUMENTS

| | | |
|---|---|---|
| CN | 86106549 | 7/1987 |
| EP | 0358638 | 8/1992 |

(Continued)

OTHER PUBLICATIONS

International Search Report and Written Opinion for International Application No. PCT/US2013/061346, dated Dec. 20, 2013, 10 pgs.

(Continued)

*Primary Examiner* — Frantz Jules
*Assistant Examiner* — Steve Tanenbaum
(74) *Attorney, Agent, or Firm* — Hamre, Schumann, Mueller and Larson, P.C.

(57) ABSTRACT

A transport refrigeration unit (TRU) for a transport refrigeration system (TRS) is described. The TRU can be configured to have an upper compartment to accommodate a compressor and an engine, and a condenser compartment that is generally positioned below the upper comportment. The condenser compartment can include a condenser and a fan at a bottom portion of the condenser compartment. The fan can be configured to blow air out of the condenser (Continued)

compartment in a downward direction from the bottom portion of the condenser compartment. The TRU can also have an evaporator compartment that is generally positioned behind the condenser compartment. The evaporator compartment can accommodate an evaporator that is generally positioned below the upper compartment. The evaporator compartment can have an air inlet and an air outlet that is positioned higher than the air outlet. In operation, airflow through the evaporator compartment is directed in a downward direction.

17 Claims, 8 Drawing Sheets

(51) Int. Cl.
*B60P 3/20* (2006.01)
*B60H 1/32* (2006.01)
*F25D 23/00* (2006.01)
*F25D 19/00* (2006.01)

(52) U.S. Cl.
CPC .............. *B60P 3/20* (2013.01); *F25D 23/003* (2013.01); *F25D 19/003* (2013.01)

(56) References Cited

U.S. PATENT DOCUMENTS

| | | | |
|---|---|---|---|
| 4,402,191 A | 9/1983 | King | |
| 4,409,797 A | 10/1983 | King et al. | |
| 4,424,684 A | 1/1984 | Waldschmidt et al. | |
| 4,802,342 A | 2/1989 | Gustafson et al. | |
| 4,888,959 A | 12/1989 | Brown | |
| 5,187,945 A | 2/1993 | Dixon | |
| 5,351,503 A * | 10/1994 | Sugimoto | B60H 1/3232 62/323.3 |
| 5,609,037 A | 3/1997 | Fischler | |
| 5,804,946 A | 9/1998 | Gaubatz et al. | |
| 5,916,253 A | 6/1999 | Amr et al. | |
| 5,927,090 A * | 7/1999 | Ladendorf | B60H 1/3232 296/24.35 |
| 6,223,546 B1 | 5/2001 | Chopko et al. | |
| 6,931,884 B2 | 8/2005 | Kolda et al. | |

FOREIGN PATENT DOCUMENTS

| | | |
|---|---|---|
| JP | 2009052833 | 3/2009 |
| JP | 2011-112267 | 6/2011 |
| KR | 20110090144 | 8/2011 |
| WO | 2008001525 | 1/2008 |
| WO | 2012-018537 | 2/2012 |

OTHER PUBLICATIONS

Chinese Office Action issued in corresponding Chinese Application No. 201380060987.X dated Jun. 27, 2016. (9 pages).

Supplementary European Search Report issued in corresponding European Application No. 13838541.4 dated Mar. 10, 2017 (5 pages).

* cited by examiner

CONDENSER EXHAUST FAN LOCATION WITHIN A TRANSPORT REFRIGERATION UNIT

FIELD OF TECHNOLOGY

Embodiments disclosed herein relate generally to a transport refrigeration system. More particularly, the embodiments disclosed herein relate to a condenser exhaust fan location within a transport refrigeration unit of the transport refrigeration system.

BACKGROUND

Existing transport refrigeration systems (TRS) are generally used to cool containers, transport units, and other similar transport units. A transport refrigeration unit (TRU) of the TRS can include a compressor, a condenser, a thermo expansion valve, an evaporator and fans and/or blowers to facilitate heat exchange. In a cooling cycle, a refrigerant can be compressed by the compressor and flow into the condenser. In the condenser, the compressed refrigerant can release heat to the environment. Then the refrigerant can pass through the thermo expansion valve. The refrigerant can then flow into the evaporator to absorb heat from air in a space to be cooled.

A fan and/or blower can be used to facilitate heat exchange between the refrigerant and the environment when the refrigerant is in the condenser and the evaporator by creating airflow through the condenser and the evaporator.

SUMMARY

The embodiments described herein are generally directed to a condenser exhaust fan location for a TRU, which can help improve fan efficiency when the TRU is in motion.

In some embodiments, the TRU can be positioned in an air gap between a tractor and a transport unit. The TRU can have an upper compartment and a condenser compartment positioned below the upper compartment. The condenser compartment can have a bottom portion. A fan (e.g. a condenser exhaust fan) can be provided on the bottom portion of the condenser compartment to blow air to the outside of the TRU. In some embodiments, the fan can be configured to blow air in a downward direction. In some embodiments, the upper compartment can contain a compressor and an engine, and the condenser compartment can be configured to house a condenser.

In some embodiments, the TRU can have an evaporator positioned behind the condenser compartment. In some embodiments, airflow through the evaporator is in a downward direction.

Other features and aspects of the embodiments will become apparent by consideration of the following detailed description and accompanying drawings.

BRIEF DESCRIPTION OF THE DRAWINGS

FIGS. 6A to 6D illustrate a computer simulation experiment of airflow velocity and pressure patterns around fan exits of the TRU.

DETAILED DESCRIPTION

Embodiments described herein generally relate to condenser exhaust fan location within a TRU.

A TRU of a TRS generally includes a condenser and an evaporator. A fan and/or blower can be used to facilitate heat exchange between a refrigerant in the condenser and/or evaporator and the environment. The fan and/or blower can generate airflow through the condenser and the evaporator. When the TRS is in motion, the efficiency of the fan and/or blower to generate the airflow can differ from the efficiency of the fan and/or blow when the TRS is stationary. Improving fan and/or blower efficiency when the TRS is in motion can help increase the heat exchange efficiency of the condenser and the evaporator and consequently the efficiency of the TRU, when the TRS is in motion.

In the following description of the illustrated embodiments, embodiments of a TRU of a TRS are described. The TRU can be configured to have an upper compartment to accommodate, for example, an engine and a compressor that is coupled to the engine. The TRU can be configured to have a condenser compartment that is positioned below the upper compartment. The condenser compartment can be configured to accommodate a condenser and a fan that is provided on a bottom portion of the condenser compartment. The fan can be configured to blow air out of the condenser compartment through the bottom portion of the condenser compartment. The TRU can also be configured to have an evaporator compartment that is generally positioned below the upper compartment. Airflow through the evaporator compartment can be generally moved in a downward direction.

References are made to the accompanying drawings that form a part hereof, and in which is shown by way of illustration of the embodiments in which the embodiments can be practiced. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. Also, the terms "upper", "lower", "above", "below", "downward" are referenced with respect to gravity. It is to be understood that the phraseology and terminology used herein is for the purpose of description and should not be regarded as limiting.

Figure 1:
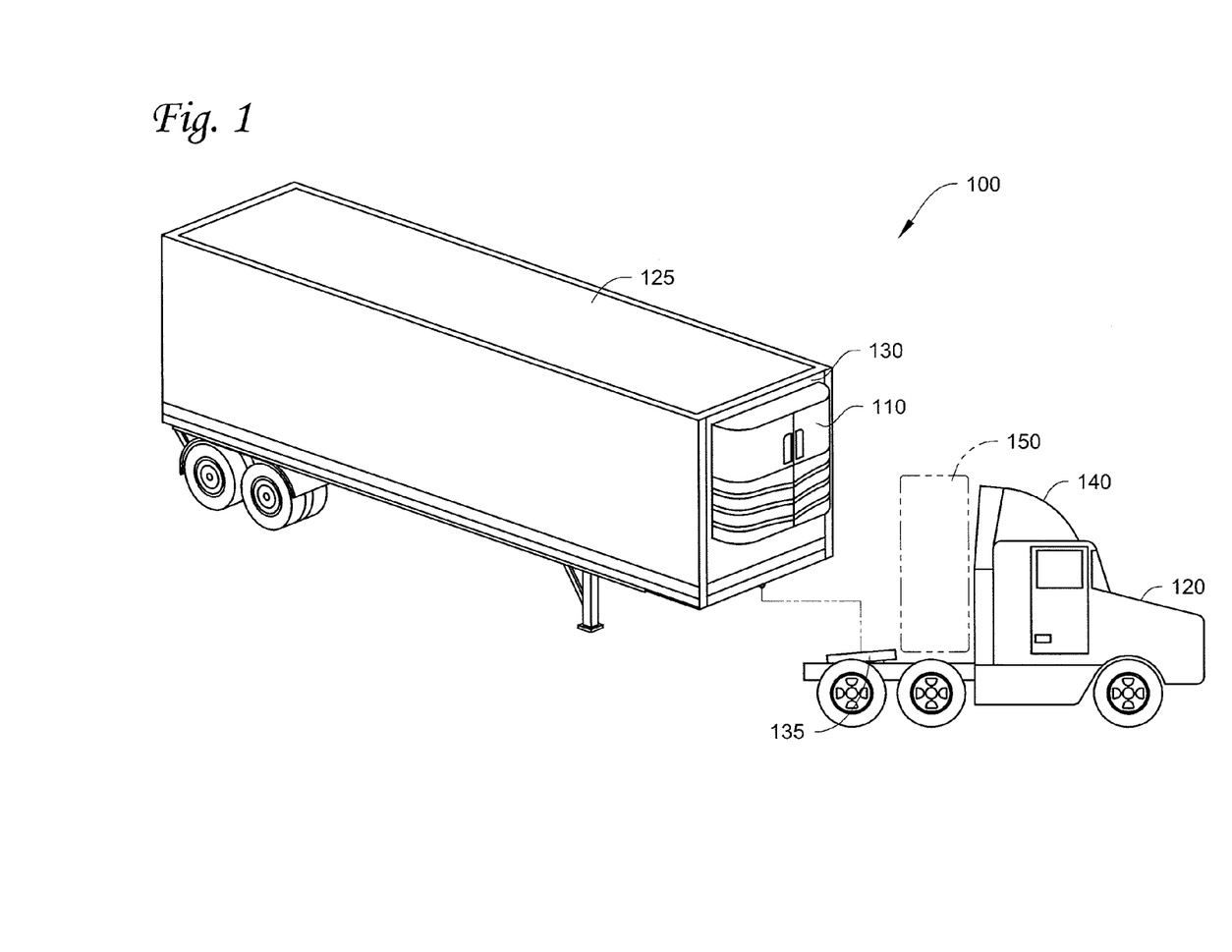
FIG. 1 illustrates a TRS with a TRU, according to one embodiment.

FIG. 1 illustrates one embodiment of a TRS 100 for a transport unit 125 that is attached to a tractor 120. The TRS includes a TRU 110 that regulates temperature within the transport unit 125. The TRU 110 is disposed on a front wall 130 of the transport unit 125. A tractor 120 is attached to and is configured to tow the transport unit 125.

The transport unit 125 can be attached to the tractor 120 via a fifth wheel 135 of the tractor 120. The tractor 120 generally has a wind deflector 140 disposed on top of the tractor 120. After the transport unit 125 is attached to the tractor 120, an air gap 150 is formed between a back of the tractor 120 including the wind deflector 140 and the front wall 130 of the transport unit 125. The TRU 110 is generally positioned in the air gap 150.

Figure 2A:
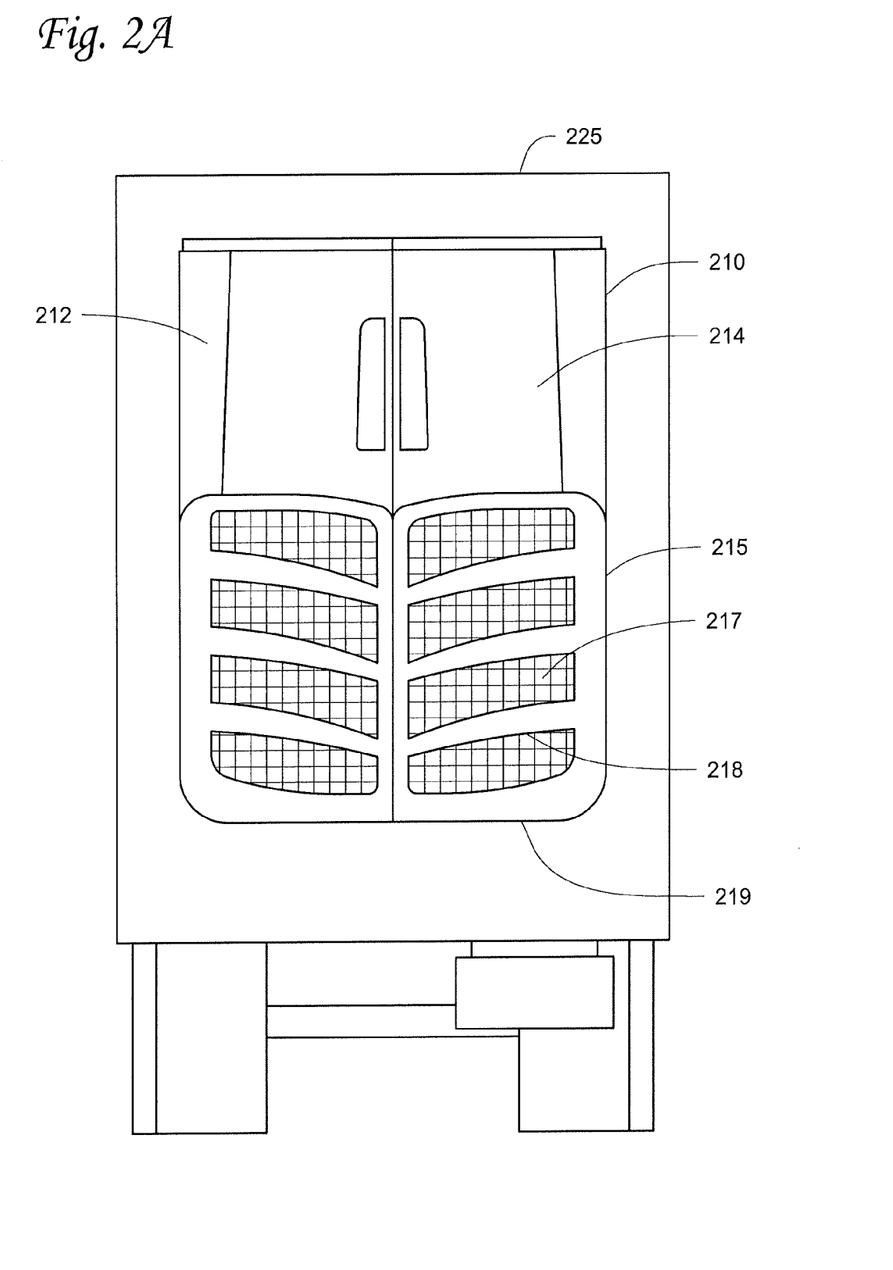
FIG. 2A illustrates a front view of a TRU disposed on a transport unit that is attached to a tractor, according to one embodiment.
Figure 2B:
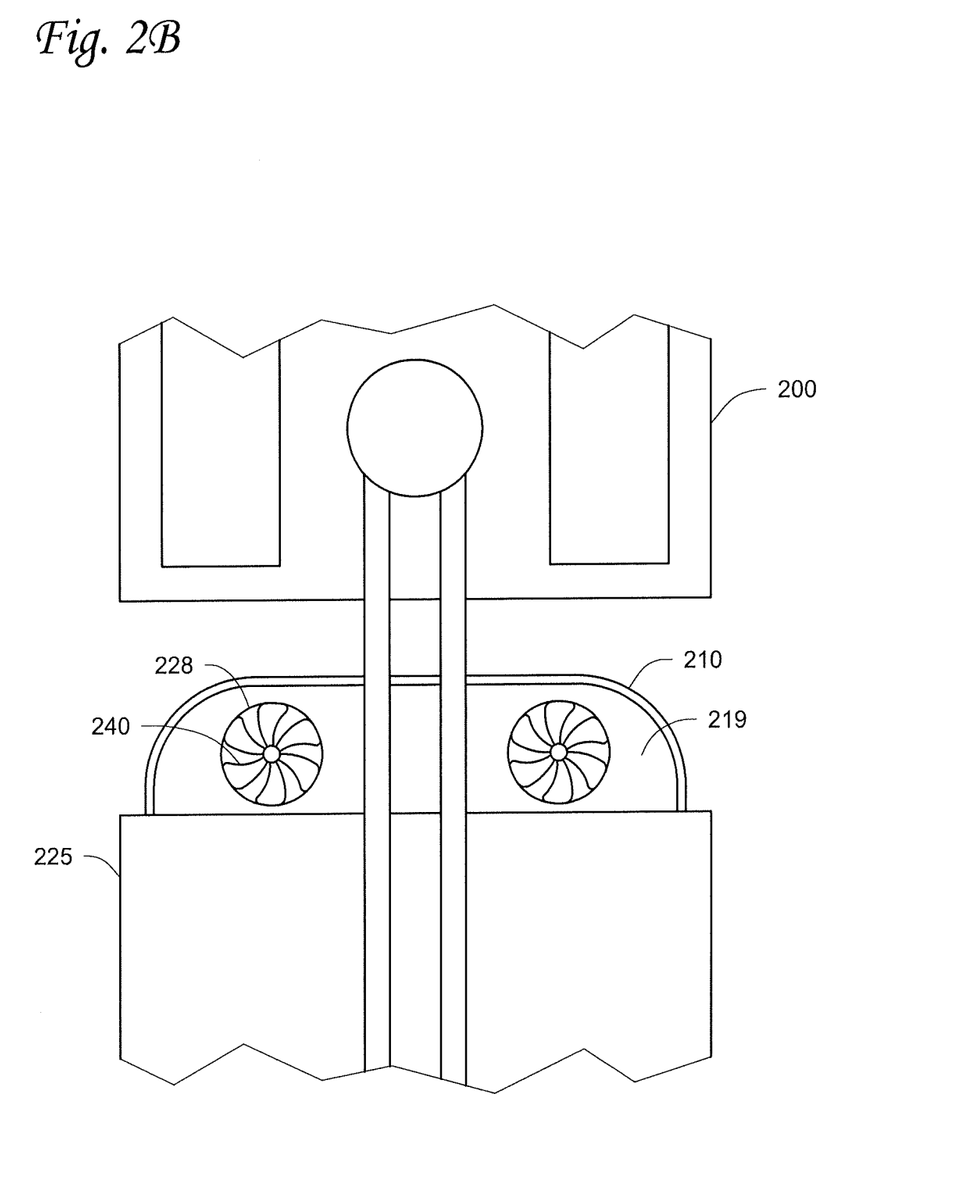
FIG. 2B illustrates a bottom view of the TRU disposed on the transport unit that is attached to the tractor shown in FIG. 2A.

Referring now to FIGS. 2A and 2B, front and bottom views of a transport unit 225 with a TRU 210 are illustrated. As shown in FIG. 2A, the TRU 210 has a housing 212, which includes an upper compartment 214 and a condenser compartment 215. A condenser 217 is positioned in the condenser compartment 215. The condenser compartment 215 is generally positioned below the upper compartment 214. The condenser compartment 215 can have a guard 218 to enclose the condenser 217. The housing 212 has a bottom portion 219. The condenser compartment 215 includes at least a portion of the bottom portion 219 of the TRU 210.

In FIG. 2B, a bottom view of the transport unit 225 that is connected to a tractor 200 is illustrated. The bottom portion 219 of the TRU 210 can include a pair of holes 228. Each of the holes 228 can be equipped with a fan 240 (e.g. a condenser exhaust fan). In other embodiments, the bottom portion can have a single hole or three or more holes.

Figure 3A:
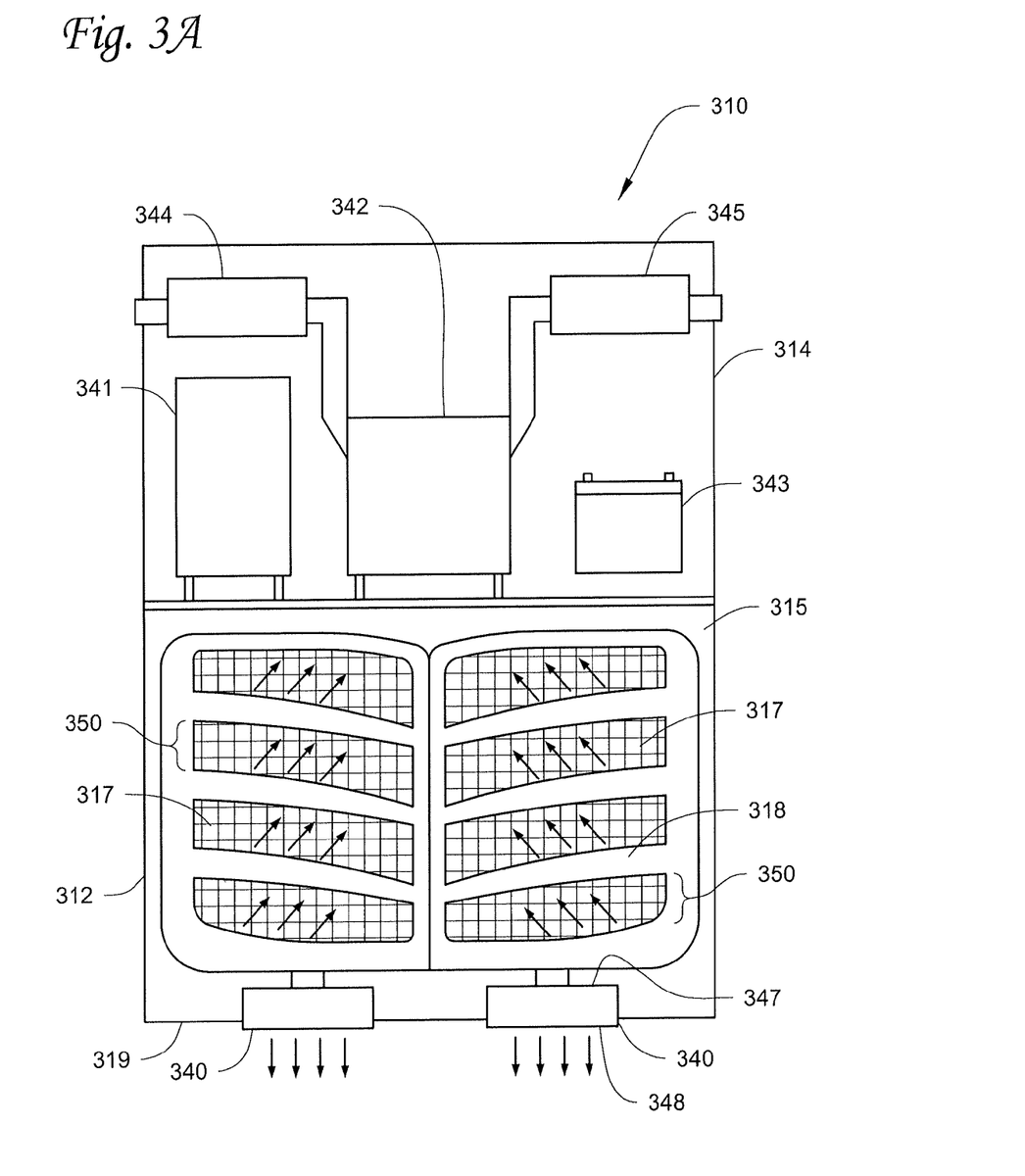
FIG. 3A illustrates a front schematic view of a TRU, according to another embodiment.
Figure 3B:
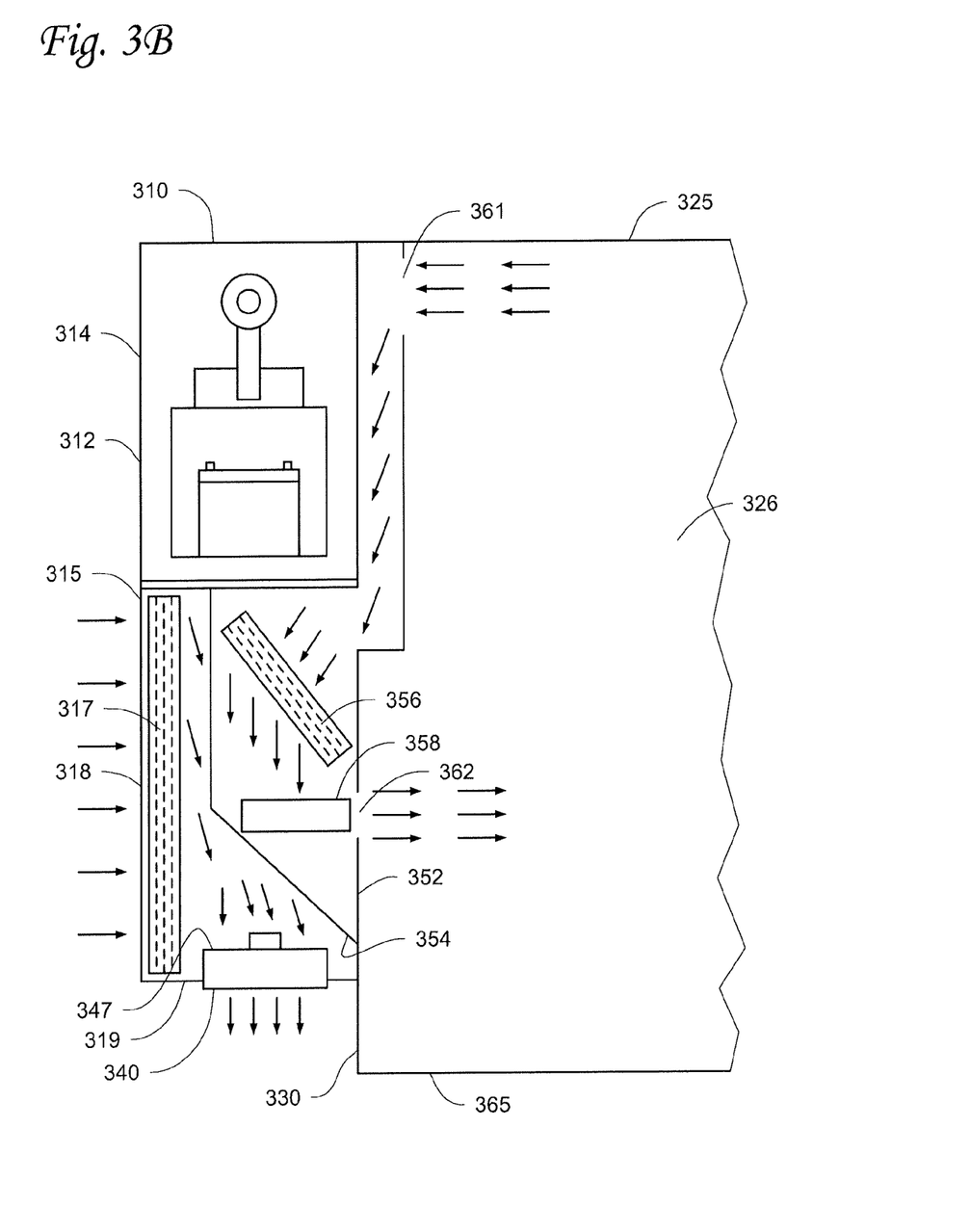
FIG. 3B illustrates a side schematic view of the TRU shown in FIG. 3A.

Referring now to FIGS. 3A and 3B, a front and side schematic view of a TRU 310 are illustrated. The TRU 310 includes a housing 312. Inside the housing 312 of the TRU 310, an upper compartment 314 is generally positioned above a condenser compartment 315.

The upper compartment 314 can be configured to contain a plurality of components of the TRU 310 including, for example, a compressor 341, an engine 342, a battery 343, an air filter 344 and/or a muffler 345. The condenser compartment 315 can contain a condenser 317. A plurality of fans 340 are installed at a bottom portion 319 of the condenser compartment 315. As illustrated in FIG. 3A, each of the fans 340 has an inlet 347 that is generally located inside the condenser compartment 315 and an outlet 348 that is generally located outside of the condenser compartment 315. A guard 318 of the condenser compartment 315 has apertures 350 to allow air to get inside the condenser compartment 315. In some embodiments, the engine 342 is a diesel engine.

FIG. 3B illustrates the side schematic view of the TRU 310. As described above, the upper compartment 314 is generally positioned above the condenser compartment 315. The condenser 317 is positioned in a front part of the condenser compartment 315 behind the guard 318. The condenser compartment 315 also includes the fan 347 that is installed at the bottom portion 319.

The TRU 310 also includes an evaporator compartment 352 that is generally positioned behind the condenser compartment 315. The condenser compartment 315 and the evaporator compartment 352 are separated by a partition 354. As illustrated, both of the condenser compartment 315 and the evaporator compartment 352 are generally positioned in a lower part of the housing 312 of the TRU 310 in relation to the upper compartment 314.

The TRU 310 is configured to be attached on a front wall 330 of a transport unit 325. The evaporator compartment 352 is configured to have a transport unit air inlet 361 and a transport unit outlet 362 in communication with an inner space 326 of the transport unit 325. A blower 358 is positioned close to the transport unit air outlet 362. An evaporator 356 is positioned in an airflow passage formed by the transport unit air inlet 361, the blower 358 and the transport unit air outlet 362. The transport unit air inlet 361 is generally positioned above the transport unit air outlet 362. In the illustrated embodiment, the blower 358 is positioned lower than the evaporator 356 in the evaporator compartment 352.

Referring now to both FIGS. 3A and 3B, the operation of the TRU 310 is further described. The arrows in FIGS. 3A and 3B indicate airflow directions. In operation, the airflow generated by the fans 340 is generally sucked into the condenser compartment 315 through the apertures 350 of the guards 318. The airflow then passes through the condenser 317 and flows out of the condenser compartment 315 through the fans 340 at the bottom portion 319. The airflow is blown in a downward direction toward a bottom 365 of the transport unit 325 by the fans 340. It is to be noted that the upper compartment 314 is generally not positioned within the airflow generated by the fans 340.

In the evaporator compartment 352, airflow generated by the operation of the blower 358 is generally sucked into the evaporator compartment 352 from the transport unit air inlet 361 and then passes through the evaporator 356. The airflow is then driven out of the transport unit air outlet 362 by the blower 358.

It is to be noted that the condenser 317, the fans 340, the evaporator 356 and the blower 362 are all configured to be positioned close to the bottom portion 319 of the TRU 310 in relation to the upper compartment 314. By positioning the condenser 317, the fans 340, the evaporator 356 and the blower 362 generally below the upper compartment 314, the upper compartment 314 can have relatively more room to accommodate components of the TRU 310 without increasing a profile of the TRU 310. The upper compartment 314 is generally isolated from the airflow generated by the operation of the fans 340 and/or the blower 358.

Generally, the upper compartment 314, which is configured to accommodate components such as the engine 342 and the compressor 341, can have a raised temperature in operation due to heat generated by the components. Isolating the upper compartment 314 from the evaporator compartment 352 that is configured to accommodate the evaporator 356 can help shield the heat generated by, for example, the engine 342 and/or the compressor 341, away from the evaporator 356.

Figure 4A:
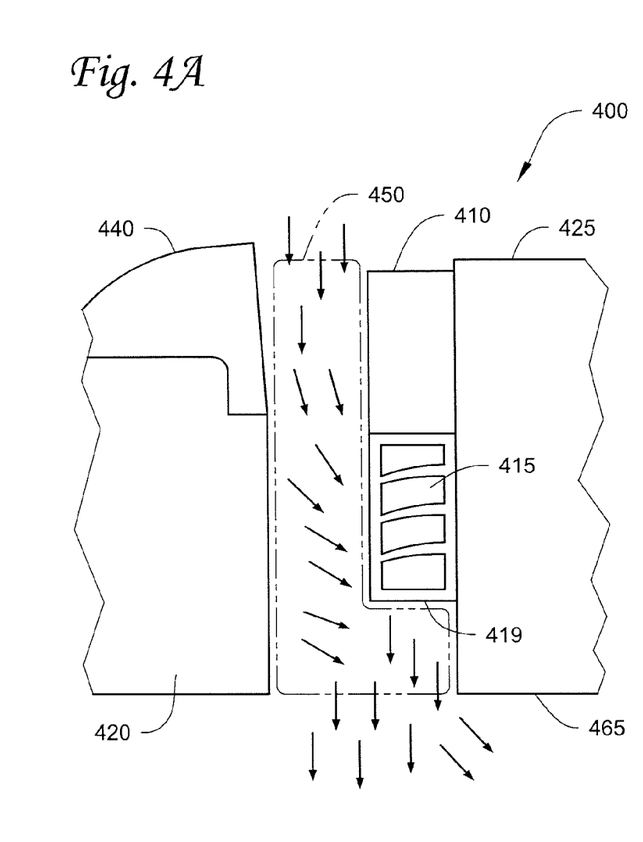
FIG. 4A illustrates airflow patterns between a transport unit and a tractor when the tractor is stationary, according to one embodiment.
Figure 4B:
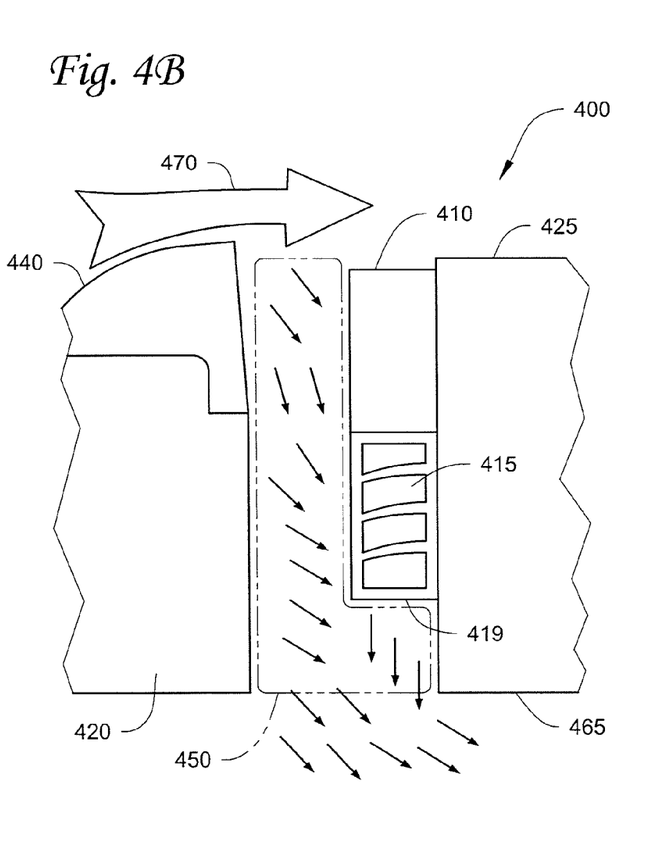
FIG. 4B illustrates airflow patterns between a transport unit and a tractor when the tractor is in motion, according to one embodiment.

Referring now to FIGS. 4A and 4B, operation of a TRU 410 of a TRS 400 is illustrated. The TRU 410 is positioned in an air gap 450 between a tractor 420 and a transport unit 425. The arrows generally show airflow patterns in the air gap 450.

FIG. 4A illustrates the operation of the TRU 410 when the TRS 400 is stationary. Airflow can get into a condenser compartment 415 and be blown out in a downward direction toward a bottom 465 of the transport unit 425. Typically, when the TRS 400 is stationary, an air pressure in the air gap 450 is generally about the same as the atmosphere pressure.

FIG. 4B illustrates the operation of the TRU 410 when the TRS 400 is in motion. A wind deflector 440 that is positioned on top of the tractor 420 can produce a wind stream 470 flowing through a top of the wind deflector 440 and a top of the transport unit 425. The wind deflector 440 is generally provided to reduce air resistance when the tractor 420 is in motion. As a speed of the TRS 400 increases, the wind stream 470 increases and the air pressure in the air gap 450 can get lower than the atmosphere pressure. As illustrated in FIG. 4B, airflow through the condenser compartment 415 can be generated by sucking air from the air gap 450 into the condenser compartment 415 and then releasing the air in a downward direction toward the bottom 465 of the transport unit 425. Since the airflow can be blown out of the TRU 410 within the air gap 450 through a bottom portion 419 of the TRU 410, the airflow exits the condenser compartment 415 within the air gap 450 that has a lower air pressure than the atmosphere pressure. Consequently, when the TRU 410 is in motion, the airflow through the condenser compartment 415 cannot be substantially affected compared to the airflow when the TRU 410 is stationary.

Experiment I

Numerical simulations were performed to simulate airflow through a condenser compartment. The airflow when the TRS is stationary and the airflow when the TRS is in motion were simulated. Simulations were performed for a conventional TRU, and an embodiment as described herein. Fans used in the conventional TRU and the embodiment as described herein have about the same specifications. The relative amount of the airflow (relative to the amount of the airflow when the TRS is stationary) in each condition is graphed in FIG. 5.

Figure 5:
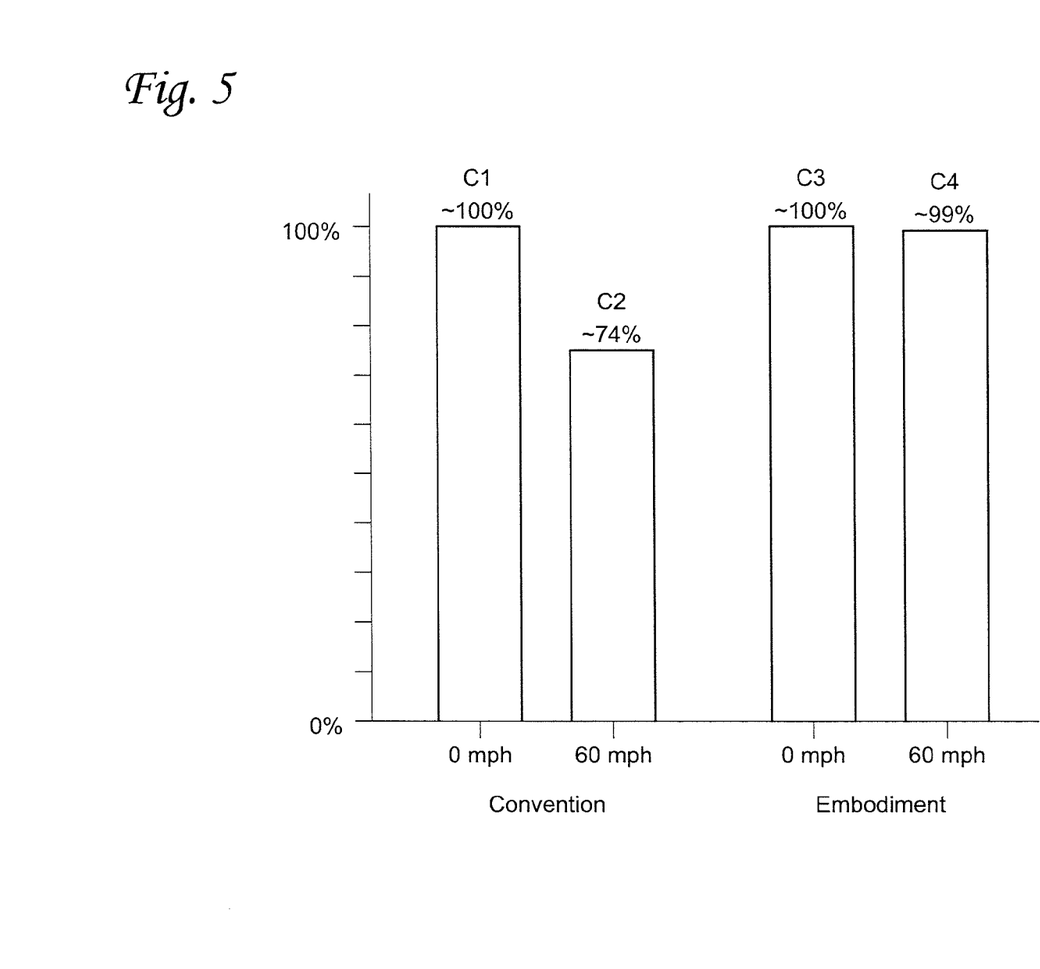
FIG. 5 is a relative airflow measured in a computer simulation experiment.

In FIG. 5, columns C1 and C2 are airflow simulation results for the conventional TRU. Column C1 corresponds to when the TRS was stationary, and column C2 corresponds to when the TRS was moving at about 60 miles per hour. Columns C3 and C4 are airflow simulation results for the embodiment as described herein. C3 corresponds to when the TRS was stationary, and column C4 corresponds to when the TRU was moving at about 60 miles per hour.

As illustrated in FIG. 5, when the TRS were in motion at about 60 miles per hour, the airflow in the conventional refrigeration system was reduced to about 74% of the airflow when the TRS was stationary. In comparison, in the embodiment as described herein, the airflow when the TRS was in motion was about the same as when the TRS was stationary. The simulation results indicates that when in motion, the airflow in the embodiment as described herein is reduced less than a conventional TRU compared to the stationary airflow. Therefore, the TRU as described herein can be more efficient than the conventional system when the TRS moves at about 60 miles per hour.

Experiment II

Figure 6A:
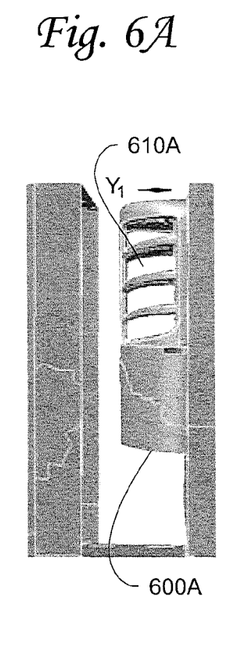
FIG. 6A illustrates a side view of a conventional TRU.
Figure 6B:
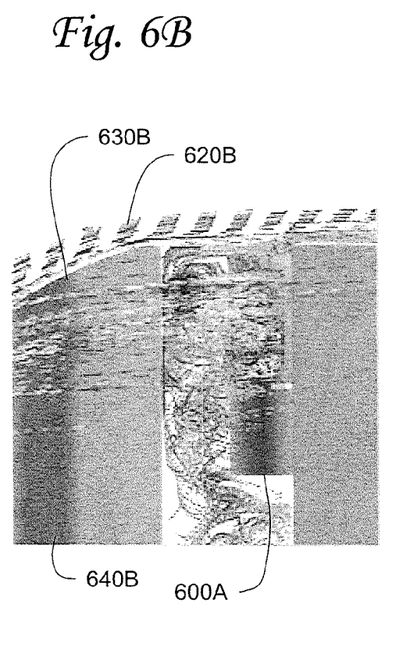
FIG. 6B illustrates airflow speed and pressure patterns in the conventional TRU shown in FIG. 6A.
Figure 6C:
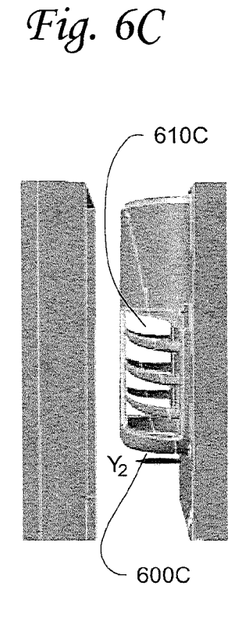
FIG. 6C illustrates a side view of a TRU according to the disclosure herein.
Figure 6D:
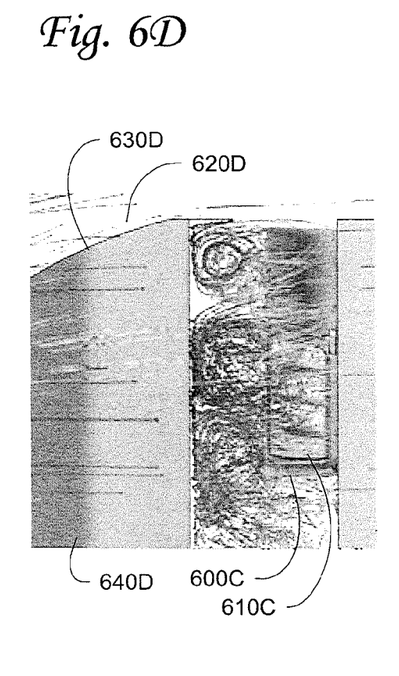
FIG. 6D illustrates airflow speed patterns in the TRU shown in FIG. 6C.

FIGS. 6A to 6D illustrate a computer simulation experiment of air velocity and pressure around fan exits 610A, 610C of two differently configured TRUs 600A and 600C respectively, when the TRUs 600A and 600C are in motion (e.g. 60 mph). FIGS. 6A and 6B illustrate a conventional TRU 600A, FIGS. 6C and 6D illustrate an embodiment of a TRU 600C as described herein.

Referring to FIGS. 6A and 6C, pressures were measured at a measuring position Y1 and Y2 for the conventional TRU 600A and the embodiment of the TRU 600C as described herein respectively. The measuring positions Y1 and Y2 are about 0.1 meter downstream of the fan exits 610A and 610C respectively. In the conventional TRU 600A, the pressure measured was about −101.0 Pa; while in the embodiment of the TRU 600C as described herein, the pressure measured was about −172.1 Pa. This result indicates that the pressure close to the TRU exit 610A of the conventional TRU 600A is higher than the TRU exit 610C of the TRU 600C as described herein. The lower pressure around the fan exits 610C in the TRU 600C as described herein can help the fans (such as fans 347 as illustrated in FIG. 3) of the TRU 600C to move air out of the TRU 600C.

FIGS. 6B and 6D illustrate an air velocity around the fan exits 610A and 610C of the TRUs 600A and 600C respectively, when the TRUs 600A and 600C are in motion. The dashed lines in FIGS. 6B and 6B represent the simulated air velocities. As illustrated in FIG. 6B, when the TRU 600A is in motion, a wind stream 620B passes through a roof 630B of a truck 640B. Because in the conventional TRU 600A, fans (not shown) are located close to the roof 630B of the truck 640B, the wind stream 620B can hamper the fan to move air out of the TRU 600A. In comparison, as illustrated in FIG. 6D, in the embodiment of a TRU 600C as described herein, since the fan exits 610C are located away from the roof 630D of the truck 640D, a wind stream 620D through the roof 630D of the truck 640D can have less effect on the fans (such as fans 347 as illustrated in FIG. 3) to move air.

Aspects

Any of aspects 1-8 can be combined with any of aspects 9-16. Any of aspects 9-14 can be combined with any of aspects 15-16.

Aspect 1. A transport refrigeration unit for a transport refrigeration system comprising:
an upper compartment housing a compressor and an engine;
a condenser compartment positioned below the upper compartment, the condenser compartment having a bottom portion;
a condenser positioned inside the condenser compartment; and
a fan provided at the bottom portion of the condenser compartment,
wherein the fan is configured to provide a downward airflow through the condenser compartment and out of the condenser compartment.

Aspect 2. The transport refrigeration unit of aspect 1 further comprising:
an evaporator compartment positioned generally behind the condenser compartment,
wherein the evaporator compartment is configured to accommodate an evaporator, and the evaporator compartment is configured to include an air inlet and an air outlet, with the air inlet being positioned above the air outlet.

Aspect 3. The transport refrigeration unit of aspect 2 further comprising:
a blower provided inside the evaporator compartment, wherein the blower is configured to generate an airflow from the air inlet to the air outlet inside the evaporator compartment.

Aspect 4. The transport refrigeration unit of aspect 1 further comprising:
an evaporator compartment positioned generally behind the condenser compartment; and
an evaporator blower,
wherein when the transport refrigeration system is in operation, the evaporator blower is configured to direct an airflow through the evaporator compartment in a generally downward direction.

Aspect 5. The transport refrigeration unit of any of aspects 1-4, wherein the upper compartment is isolated from the condenser compartment.

Aspect 6. The transport refrigeration unit of any of aspects 1-5, wherein the entire condenser compartment is configured to be positioned in an air gap with a relatively lower air pressure when the transport refrigeration system is in motion compared to when the transport refrigeration system is stationary, and an outlet of the fan is configured to be positioned in the air gap.

Aspect 7. The transport refrigeration unit of any of aspects 1-6, wherein the fan is configured to direct the airflow out of the transport refrigeration unit.

Aspect 8. The transport refrigeration unit of any of aspects 1-7, wherein the fan is configured to direct the airflow in a direction that is away from the upper compartment.

Aspect 9. A transport refrigeration unit for a transport refrigeration system comprising:
an upper compartment;
a condenser compartment positioned below the upper compartment, wherein the condenser compartment is positioned at a lower portion of the transport refrigeration unit; and
a condenser positioned inside the condenser compartment.

Aspect 10. The transport refrigeration unit of aspect 9 further comprising:
an evaporator; and
an evaporator blower,
wherein the evaporator blower is positioned on the lower portion of the transport refrigeration unit.

Aspect 11. The transport refrigeration unit of aspect 10, wherein during operation, the evaporator blower is configured to provide a downward airflow through the evaporator.

Aspect 12. The transport refrigeration unit of any of aspects 9-11, wherein the entire condenser compartment is configured to be positioned in an air gap with a relatively lower air pressure when the transport refrigeration system is in motion compared to when the transport refrigeration system is stationary, and
wherein an outlet of the fan is configured to be positioned in the air gap.

Aspect 13. The transport refrigeration unit of any of aspects 9-12, further comprising:
a fan positioned in the condenser compartment, wherein the fan is configured to direct the airflow out of the transport refrigeration unit.

Aspect 14. The transport refrigeration unit of any of aspects 9-12, further comprising:
a fan positioned in the condenser compartment, wherein the fan is configured to direct the airflow in a direction that is away from the upper compartment.

Aspect 15. A method of directing airflow in a transport refrigeration unit of a transport refrigeration system comprising:
directing an airflow into a lower compartment of the transport refrigeration unit from an air gap between the transport refrigeration unit and a transport unit; and
directing the airflow out of the lower compartment of the transport refrigeration unit from a bottom of the transport refrigeration unit to the air gap.

Aspect 16. The method of aspect 15, further comprising:
directing a second airflow into an evaporator compartment from a top of the transport refrigeration unit; and
directing the second airflow in a downward direction through the evaporator compartment.

With regard to the foregoing description, it is to be understood that changes can be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

What is claimed is:

1. A transport refrigeration unit for a transport refrigeration system comprising:
an upper compartment housing a compressor and an engine;
a condenser compartment positioned below the upper compartment, the condenser compartment having a bottom portion that includes a hole through a bottom of the transport refrigeration unit;
a condenser positioned inside the condenser compartment; and
a fan provided at the bottom portion of the condenser compartment,
wherein the fan is configured to provide a downward airflow through the condenser compartment and blow the downward airflow out of the bottom of the transport refrigeration unit via the hole,
wherein the upper compartment is isolated from the downward airflow generated within the condenser compartment.

2. The transport refrigeration unit of claim 1 further comprising:
an evaporator compartment positioned generally behind the condenser compartment,
wherein the evaporator compartment is configured to accommodate an evaporator, and the evaporator compartment is configured to include an air inlet and an air outlet, with the air inlet being positioned above the air outlet.

3. The transport refrigeration unit of claim 2 further comprising:
a blower provided inside the evaporator compartment, wherein the blower is configured to generate an airflow from the air inlet to the air outlet inside the evaporator compartment.

4. The transport refrigeration unit of claim 1 further comprising:
an evaporator compartment positioned generally behind the condenser compartment; and
an evaporator blower,
wherein when the transport refrigeration system is in operation, the evaporator blower is configured to direct an airflow through the evaporator compartment in a generally downward direction.

5. The transport refrigeration unit of claim 1, wherein the entire condenser compartment is configured to be positioned in an air gap with a relatively lower air pressure when the transport refrigeration system is in motion compared to when the transport refrigeration system is stationary, and an outlet of the fan is configured to be positioned in the air gap.

6. The transport refrigeration unit of claim 1, wherein the fan is configured to direct the airflow out of the transport refrigeration unit.

7. The transport refrigeration unit of claim 1, wherein the fan is configured to direct the airflow in a direction that is away from the upper compartment.

8. A transport refrigeration unit for a transport refrigeration system comprising:
an upper compartment housing an engine;

a condenser compartment positioned below the upper compartment, wherein the condenser compartment is positioned at a lower portion of the transport refrigeration unit, and wherein the condenser compartment includes a hole through a bottom of the transport refrigeration unit;

a condenser positioned inside the condenser compartment; and a fan positioned at a bottom of the condenser compartment and configured to generate a downward airflow by blowing air within the condenser compartment in a downward direction through the hole and out of the transport refrigeration unit, wherein the upper compartment is isolated from the downward airflow generated within the condenser compartment.

9. The transport refrigeration unit of claim 8 further comprising:
an evaporator; and
an evaporator blower,
wherein the evaporator blower is positioned on the lower portion of the transport refrigeration unit.

10. The transport refrigeration unit of claim 9, wherein during operation, the evaporator blower is configured to provide a downward airflow through the evaporator.

11. The transport refrigeration unit of claim 8, wherein the entire condenser compartment is configured to be positioned in an air gap with a relatively lower air pressure when the transport refrigeration system is in motion compared to when the transport refrigeration system is stationary, and wherein an outlet of the fan is configured to be positioned in the air gap.

12. The transport refrigeration unit of any of claim 8, further comprising:
a fan positioned in the condenser compartment, wherein the fan is configured to direct the airflow out of the transport refrigeration unit.

13. The transport refrigeration unit of claim 8, further comprising:
a fan positioned in the condenser compartment, wherein the fan is configured to direct the airflow in a direction that is away from the upper compartment.

14. A method of directing airflow in a transport refrigeration unit of a transport refrigeration system comprising:
directing an airflow into a lower compartment of the transport refrigeration unit from an air gap between the transport refrigeration unit and a transport unit, wherein directing the airflow into the lower compartment includes a fan positioned at a bottom portion of the lower compartment generating a downward airflow that is isolated from an upper compartment of the transport refrigeration unit that includes an engine; and directing the airflow out of the lower compartment of the transport refrigeration unit from a bottom of the transport refrigeration unit to the air gap, wherein directing the airflow out of the lower compartment of the transport refrigeration unit includes the fan blowing the airflow through a hole at the bottom portion of the lower compartment.

15. The method of claim 14, further comprising:
directing a second airflow into an evaporator compartment from a top of the transport refrigeration unit; and
directing the second airflow in a downward direction through the evaporator compartment.

16. The transport refrigeration unit of claim 1, wherein the fan has an inlet located inside the condenser compartment and an outlet located outside of the condenser compartment.

17. The transport refrigeration unit of claim 8, wherein the fan has an inlet located inside the condenser compartment and an outlet located outside of the condenser compartment.

* * * * *